(12) United States Patent
Toyoda et al.

(10) Patent No.: US 10,569,461 B2
(45) Date of Patent: Feb. 25, 2020

(54) PREFORM FOR BIAXIAL STRETCHING BLOW MOLDING, AND CONTAINER

(71) Applicant: DISCMA AG, Hunenberg (CH)

(72) Inventors: Tamotsu Toyoda, Tokyo (JP); Masaaki Sasaki, Tokyo (JP); Shinichi Tabata, Kanagawa (JP)

(73) Assignee: DISCMA AG, Zürich (CH)

( * ) Notice: Subject to any disclaimer, the term of this patent is extended or adjusted under 35 U.S.C. 154(b) by 274 days.

(21) Appl. No.: 15/531,257

(22) PCT Filed: Oct. 9, 2015

(86) PCT No.: PCT/JP2015/005145
§ 371 (c)(1),
(2) Date: May 26, 2017

(87) PCT Pub. No.: WO2016/084300
PCT Pub. Date: Jun. 2, 2016

(65) Prior Publication Data
US 2017/0326779 A1 Nov. 16, 2017

(30) Foreign Application Priority Data
Nov. 28, 2014 (JP) .................. 2014-242120

(51) Int. Cl.
*B29C 49/08* (2006.01)
*B29C 49/22* (2006.01)
*B29C 49/00* (2006.01)
*B29C 49/12* (2006.01)

(52) U.S. Cl.
CPC .......... *B29C 49/08* (2013.01); *B29C 49/0005* (2013.01); *B29C 49/22* (2013.01); *B29C 2049/1261* (2013.01)

(58) Field of Classification Search
None
See application file for complete search history.

(56) References Cited

U.S. PATENT DOCUMENTS

| | | |
|---|---|---|
| 2005/0206045 A1 | 9/2005 | Desanaux et al. |
| 2006/0105127 A1 | 5/2006 | Akiyama et al. |
| 2010/0080944 A1 | 4/2010 | Etesse |
| 2011/0217500 A1 | 9/2011 | Gottschalk et al. |
| 2014/0353884 A1 | 12/2014 | Sato et al. |
| 2015/0210420 A1 | 7/2015 | Hosokoshiyama |

FOREIGN PATENT DOCUMENTS

| | | |
|---|---|---|
| JP | 2009-149008 A | 7/2009 |
| JP | 2012-196878 A | 10/2012 |
| JP | 2014-091529 A | 5/2014 |
| JP | 2014-172643 A | 9/2014 |

*Primary Examiner* — Monica A Huson
(74) *Attorney, Agent, or Firm* — Eric J. Sosenko; Jonathan P. O'Brien; Honigman LLP

(57) ABSTRACT

A preform for biaxial stretching blow molding. The preform being formed into a closed-end cylinder by direct blow molding and which is to be shaped into a container using a pressurizing liquid medium. The preform has either a single-layer or a multilayer structure constituted of one of a polyethylene resin having an MFR of 1.0-1.5 g/10 min. or a polypropylene resin having an MFR of 0.8 to 2.3 g/10 min.

9 Claims, 7 Drawing Sheets

(a)

(b)

|  | Preform A | Preform B | Preform C | Preform D |
|---|---|---|---|---|
| Layer structure | Multilayer | Multilayer | Single-Layer | Single-Layer |
| Resin of the preform (Resin of the outer layer in the case of multilayer), MFR | LDPE, 1.0 g/10 min | LDPE, 1.0 g/10 min | HDPE, 2.0 g/10 min | HDPE, 1.6 g/10 min |
| Resin of the adhesive layer, MFR | Modified polyolefin, 0.9 g/10 min | --- | --- | --- |
| Resin of the inner layer, MFR | EVOH, 2.6 g/10 min | EVOH, 2.0 g/10 min | --- | --- |
| Resin of the innermost layer, MFR | Modified polyolefin, 0.9 g/10 min | Modified polyolefin, 0.9 g/10 min | --- | --- |

|  | Preform E | Preform F | Preform G | Preform H |
|---|---|---|---|---|
| Layer structure | Multilayer | Multilayer | Single-Layer | Single-Layer |
| Resin of the preform (Resin of the outer layer in the case of multilayer), MFR | HDPE, 4.7 g/10 min | PP, 0.8 g/10 min | PP, 1.7 g/10 min | PP, 2.3 g/10 min |
| Resin of the adhesive layer, MFR | --- | --- | --- | --- |
| Resin of the inner layer, MFR | --- | --- | --- | --- |
| Resin of the innermost layer, MFR | --- | --- | --- | --- |

TABLE 1

FIG. 5

| | Example 1 | Example 2 | Comparative example 1 | Example 3 | Comparative example 2 | Example 4 | Example 5 | Example 6 |
|---|---|---|---|---|---|---|---|---|
| Type of preform (Table 1) | Preform A | Preform B | Preform C | Preform D | Preform E | Preform F | Preform G | Preform H |
| Pressurizing medium | air | air | air | air | air | air | air | air |
| Result of biaxial stretching blow molding in the case of shaping a container whose stretch magnification is about three fold | △ | ○ | × | ○ | × | ○ | × | △ |
| Result of biaxial stretching blow molding in the case of shaping a container whose stretch magnification is about five fold | ○ | ○ | × | ○ | × | ○ | △ | ○ |

TABLE 2

FIG. 6

| | Comparative example 3 Preform A | Comparative example 4 Preform B | Comparative example 5 Preform C | Comparative example 6 Preform D | Comparative example 7 Preform E | Comparative example 8 Preform F | Comparative example 9 Preform G | Comparative example 10 Preform H |
|---|---|---|---|---|---|---|---|---|
| Type of preform (Table 1) | | | | | | | | |
| Pressurizing medium | air | air | air | air | air | air | air | air |
| Result of biaxial stretching blow molding in the case of shaping a container whose stretch magnification is about three fold | △ | △ | × | × | × | × | × | △ |
| Result of biaxial stretching blow molding in the case of shaping a container whose stretch magnification is about five fold | × | × | × | × | × | × | × | × |

TABLE 3

FIG. 7

PREFORM FOR BIAXIAL STRETCHING BLOW MOLDING, AND CONTAINER

BACKGROUND

1. Field of the Invention

The present invention relates to a preform for biaxial stretching blow molding, and in particular to a preform formed by direct blow molding, and a container formed from this preform by biaxial stretching blow molding.

2. Related Technology

In recent years, synthetic resin blow molded containers have been used in a large amount and in many areas since they have many excellent characteristics, such as light weight and excellent appearance and design properties. This type of container is formed by biaxial stretching blow molding of a preform, molded into a closed-end cylinder like a test tube, by longitudinally stretching in an axial direction with a stretching rod and by expanding traverse stretching by air blown into the preform from a blow nozzle tightly fitted in the mouth part of the tube in a heated condition of a temperature where a stretching effect can be apparent. In such biaxial stretching blow molding, since molecules of the resin are oriented along the stretching direction by stretching, there is an advantage that mechanical strength, transparency and gas barrier property are improved.

Here, it has been widely practiced to form the preform for biaxial stretching blow molding, as shown in Japanese Unexamined Patent Publication No. Heisei 9-300438, for example, by injection molding where a molten resin is injected against a mold having a cavity mold for forming the outer surface of the preform and a core mold for forming the inner surface of the preform. However, in the case of forming the preform by injection molding, the structure becomes complicated as the number of members constituting the mold increases, which leads to a cost increase.

In order to impart a function such as gas barrier property and light shielding property to the container, for example, as shown in Japanese Unexamined Patent Publication No. 2004-130650, for example, it is common to use a preform in which a plurality of resins, including resins having these functions, are provided in a layer form. Such a preform having a multilayer structure can be formed by shifting the injection timing of each molten resin. However, in the case of forming a preform having a multilayer structure by injection molding, as shown in FIG. 4 of Japanese Unexamined Patent Publication No. 2004-130650, the molten resin injected later flows into the center portion in the thickness direction of the resin because solidification starts from both side parts (parts which become the outer surface and the inner surface of the preform) contacting to the mold. That is, since the multilayered preform formed by injection molding has a layered structure symmetrical to the thickness direction, so the layer structure of the obtained container is limited to those which are symmetrical to the thickness direction.

Meanwhile, as a means for forming a container, direct blow molding in which a tubular molten parison pushed out from an extruder is sandwiched between molds and in which a pressurized gas is blown into it to shape into a shape along the inner surface of the mold (for example, refer to Japanese Unexamined Patent Publication No. Heisei 7-178854). In such direct blow molding, although the stretching effect described above cannot be obtained, the layer structure of the molten parison is not limited to those symmetrical in the thickness direction, so a container having various layer structures can be formed.

Under such backgrounds, the inventor of the present invention has conceived a new molding method that takes advantage of the advantages of biaxial stretching blow molding and direct blow molding. That is, if the preform used for the biaxial stretching blow molding is formed by direct blow molding, the degree of freedom of the layer structure increases, and the core mold for forming the inner surface of the preform becomes unnecessary, so it is possible to form the preform at a lower cost. In addition, by stretching the preform, the mechanical strength, transparency and gas barrier property of the container can be improved.

SUMMARY

Meanwhile, in the conventional biaxial stretching blow molding where pressurized air is used for the transverse stretching, when the preform by such direct blow molding was used, the preform has ruptured in some cases while shaping the preform into a container. Particularly, in a container with a large stretch magnification, this tendency was strongly exhibited.

In addition, in direct blow molding, it is common to use a split mold which is divided into right and left with the axis of a product to be molded as a border, and a body thickness of the product in the vicinity of the parting line, which is an interface of the mold, tends to be thicker than the body thickness of the other parts. Therefore, in the case of forming the preform by usual direct blow molding, since the difference between the body thickness in the vicinity of the parting line and the body thickness at a position where deviated by 90 degrees from the parting line becomes large, there is a possibility to cause rupturing of the preform during stretching by biaxial stretching blow molding. Particularly, since the bottom part of the preform is the part where the stretching rod acts directly on, in order to prevent such rupture, it is necessary to make the circumferential body thickness distribution at the bottom part as even as possible.

In view of the above drawbacks and limitations, herein is proposed a technology in which the preform formed by direct blow molding, without rupturing during biaxial stretching blow molding, is stably shaped into a container. Furthermore, a technology that can equalize the circumferential body thickness distribution at the bottom part of the preform is proposed.

In one aspect, a preform for biaxial stretching blow molding which is formed into a closed-end cylinder by direct blow molding and shaped into a container by using a pressurizing liquid medium is provided, wherein the preform has a single-layer or a multilayer structure, at least one layer thereof being configured of a polyethylene resin having an MFR of 1.0 to 1.5 g/10 min.

The preform may have a multilayer structure and may be provided with an inner layer configured of an ethylene vinyl alcohol copolymer resin on the inner side of the outer layer configured of the polyethylene resin.

The preform may have a band shaped adhesive layer formed of a modified polyolefin resin and extending in the axial direction between the outer layer and the inner layer.

The preform may be provided with an innermost layer configured of a modified polyolefin resin inside the inner layer.

In another aspect, the preform for biaxial stretching blow molding which is formed into a closed-end tubular shape by direct blow molding and shaped into a container by using a pressurizing liquid medium is provided, wherein the preform is configured of polypropylene resin whose MFR is of 0.8 to 2.3 g/10 min.

The preform may be provided with a cross shaped parting line at the bottom part.

In addition, the present invention is a container shaped by biaxial stretching blow molding using a pressurizing liquid medium.

As a result of extensive studies by the present inventors, it has been found that rupture of the preform formed by direct blow molding in biaxial stretching blow molding is greatly related to pressurized air used for transverse stretching of the preform, and it has been found that the frequency of rupture can be greatly reduced by using a liquid as a pressurizing medium. Moreover, it has been found that shaping into a container is stably performed as long as the preform has a single-layer or a multilayer structure, where at least one layer is configured of a polyethylene resin having an MFR of 1.0 to 1.5 g/10 min, or a polypropylene resin having an MFR of 0.8 to 2.3 g/10 min.

In the present invention, the preform formed by direct blow molding can be stably shaped into a container by biaxial stretching blow molding.

BRIEF DESCRIPTION OF THE DRAWINGS

FIG. 1 illustrates a preform embodying the principles of the present invention, and in which FIG. 1(a) is a half cross sectional view showing a single-layer structure, FIG. 1(b) is a half cross sectional view showing a multilayer structure, and FIG. 1(c) is a bottom view of (a) and (b).

FIG. 2 illustrates a container where the preform of FIG. 1 is shaped by biaxial stretching blow molding using a liquid as a pressurizing medium, and in which FIG. 2(a) is a side view, and FIG. 2(b) is a bottom view.

FIG. 3 illustrates a body thickness distribution at the bottom part of the preform shown in FIG. 1, and in which FIG. 3(a) is shows a measurement position, and FIG. 3(b) is shows the measurement result of the body thickness.

FIG. 4 illustrates a body thickness distribution at the bottom part of the container shown in FIG. 2, and in which FIG. 4(a) is shows a measurement position of the preform, FIG. 4(b) is shows a measurement position of a reference example, and FIG. 4(c) is shows the result of the body thickness measurement.

FIG. 5 presents Table 1 referred to in the Detailed Description.

FIG. 6 presents Table 2 referred to in the Detailed Description.

FIG. 7 presents Table 3 referred to in the Detailed Description.

DETAILED DESCRIPTION

Hereinafter, preforms embodying the principles of the present invention will be described more specifically with reference to the drawings.

Figure 1:
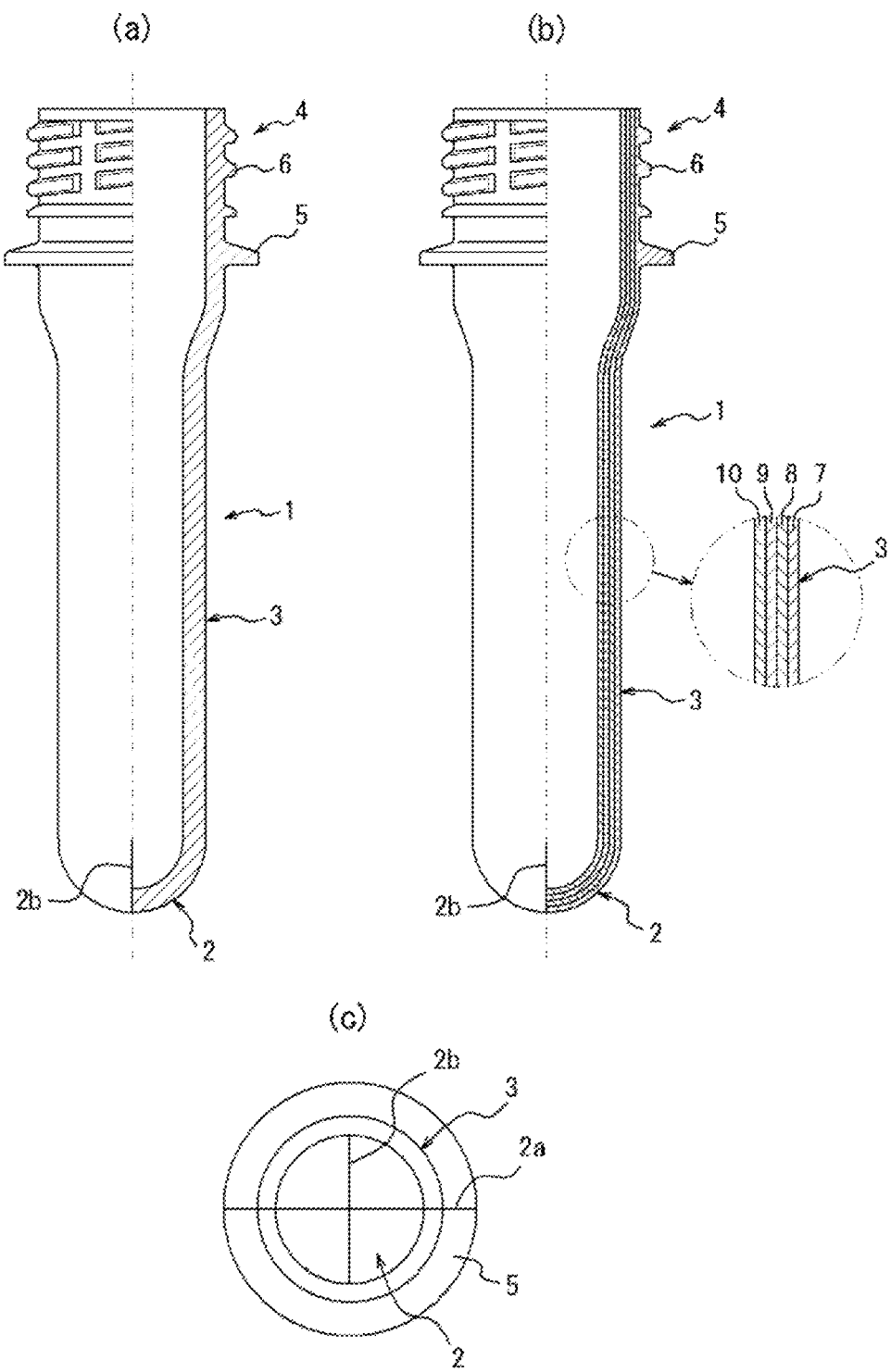

In FIG. 1, a preform incorporating the principles present invention is designated at 1. The preform 1 is formed by direct blow molding in which a tubular melted parison is pushed out from an extruder (not shown) and is sandwiched between molds, and thereafter a pressurized gas is blown into the preform 1 to shape it into a shape along the inner surface of the mold.

The preform 1 seen in FIG. 1 is a closed-end cylinder as a whole and configured of a hemispherical shell shaped bottom part 2, a cylinder body part 3 connected to the bottom part 2, a mouth part 4 opening at the upper part of the body part 3. A disk shaped neck ring 5 and a male screw part 6, provided above the neck ring 5, are provided on the mouth part 4. In addition, the preform 1 has a single-layer structure as shown in FIG. 1(a) or a multilayer structure as shown in FIG. 1(b).

In addition, the mold forming the preform 1 has a two split structure in which the mold part corresponding from the mouth part 4 to the body part 3 is divided with a single plane including the axis of the preform 1 as a border. In addition, the mold part corresponding to the bottom part 2 is a four split structure which is divided into four parts the previously mention plane through the axis of the preform 1 and another plane being orthogonal to that plane as the other boundary. That is, in the parting line formed on the interface of the mold part, in the bottom part 2, as shown in FIG. 1(c), the two parting lines 2a and 2b cross each other and extend in a cross shape, and one of the two parting lines 2a and 2b (the parting line 2a is shown in the illustrated example) linearly extends from the body part 3 to the mouth part 4.

In the case of the single-layer structure shown in FIG. 1(a), it is configured of a polyethylene resin (PE) having an MFR (melt flow rate) of 1.0 to 1.5 g/10 min, or a polypropylene resin (PP) having a MFR of 0.8 to 2.3 g/10 minutes. Here, the polyethylene resin includes low density polyethylene resin (LDPE), high density polyethylene resin (HDPE) and the like, and MFR is a value measured by a method in accordance with JIS (Japanese Industrial Standard) K6922. The MFR of the polypropylene resin is a value measured by a method in accordance with JIS K6921.

In the case of the multilayer structure shown in FIG. 1(b), at least one layer is configured of a polyethylene resin having an MFR of 1.0 to 1.5 g/10 min. In this construction, this polyethylene resin is used as an outer layer 7, and a band shaped adhesive layer 8 extending in the axial direction of the preform 1 is provided inside the outer layer 7 (the adhesive layer 8 may be one or more layers), furthermore, an inner layer 9 and an innermost layer 10 are sequentially provided inside the adhesive layer 8. In the present construction, the adhesive layer 8 is configured of a modified polyolefin resin (such as "Admer" (registered trademark), and the like manufactured by Mitsui Kagaku, Co., Ltd.), the inner layer 9 is configured of an ethylene vinyl alcohol copolymer resin (EVOH), and the innermost layer 10 is made of a modified polyolefin resin.

Since the ethylene vinyl alcohol copolymer resin used for the inner layer 9 has a low compatibility with the polyethylene resin used for the outer layer 7, after shaping the preform 1 into a container to be described later, the inner layer 9 can be peeled off from the outer layer 7 except for the part adhered with the adhesive layer 8. That is, the preform 1 adopting such a layer structure can be used to form a double container which can reduce the volume of the inner layer 9 against the outer layer 7 as contents contained in the container is extracted. In addition, since the ethylene vinyl alcohol copolymer resin is hard to permeate oxygen, it can impart a gas barrier function. It should be noted that although the ethylene vinyl alcohol copolymer resin tends to pass oxygen as the humidity increases, since the modified polyolefin resin used for the innermost layer 10 has a high compatibility with the ethylene vinyl alcohol copolymer resin and hardly permeates moisture, the gas barrier property can be maintained. It should be noted that the multilayer structure is not limited to the layer and resin described above, and for example, the adhesive layer 8 and the innermost layer 10 may be omitted, in addition, a layer may be further provided on the outside of the outer layer 7 or the inside of the innermost layer 10.

In the biaxial stretching blow molding of the preform 1 having such a configuration, a liquid is used as a pressurizing medium for stretching the preform 1 transversely. It should be noted that various liquids can be used. For example, in a container for beverages, by using water, tea, a refreshing drink or the like to fill the container, and in a container for toiletry, by using a cosmetic, shampoo, rinse or the like, it is possible to omit the filling process, and the production line can be simplified.

Figure 2:
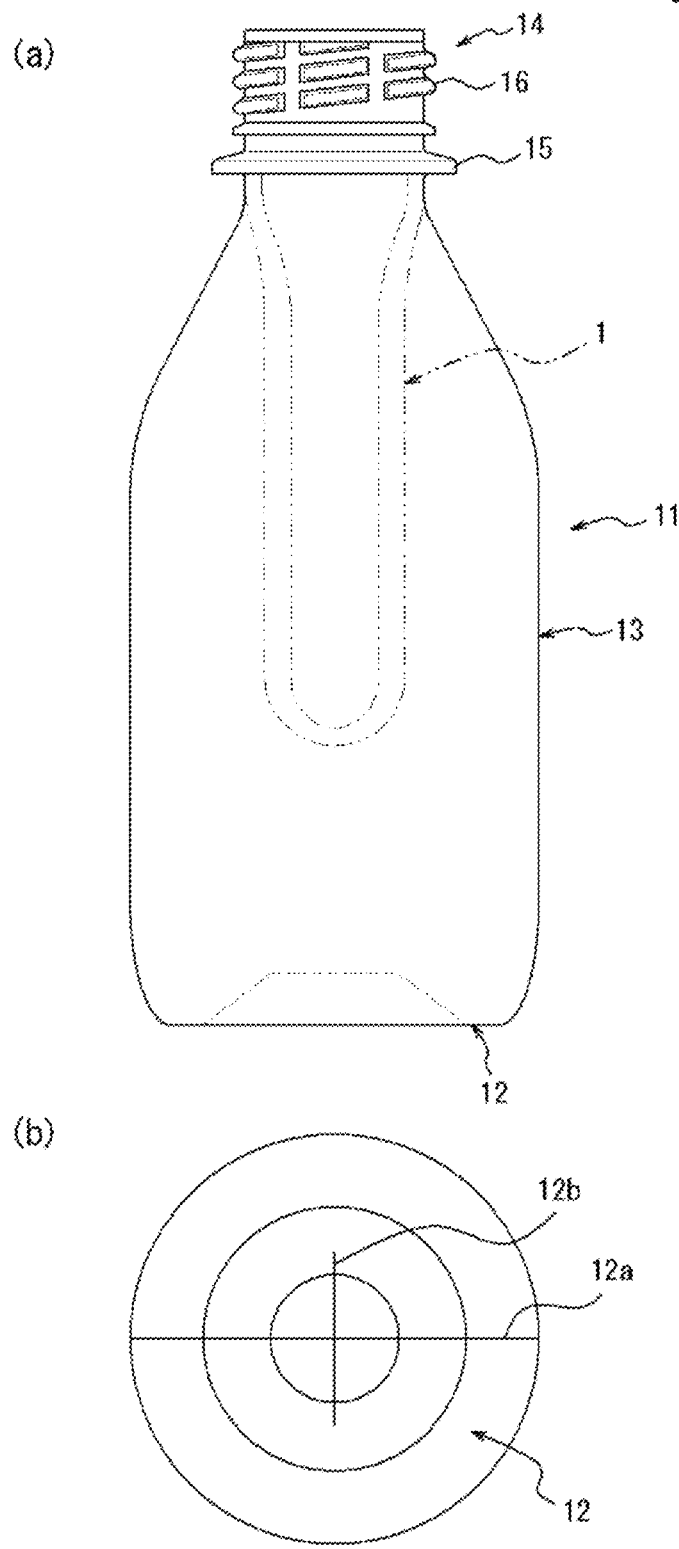

Moreover, the preform 1 heated to a temperature at which a stretching effect can appear is mounted on a molding mold (not shown), by longitudinal stretching with a stretching rod of a blow molding apparatus (also not shown), and by transverse stretching with pressurized liquid injected into the preform 1 from a nozzle placed on the mouth part 4, the preform 1 is shaped into a shape along the cavity of the molding mold to form a desired container. As shown in FIG. 2, a container 11 of this present embodiment extends the bottom part 2 and the body part 3 of the preform 1 while the mouth portion 4 is not stretched, and is configured of a disk shaped bottom part 12 wherein the center part is concaved toward the inside of the container 11, a cylindrical body part 13 connected to the bottom part 12 and having a reduced diameter, and a mouth part 14 (having a neck ring 15 and a male screw part 16) which is opened at the upper part of the body part 13. It should be noted that, in FIGS. 2(b), 12a and 12b indicate parting line marks corresponding to the two parting lines 2a and 2b described above. It should be noted that the parting line marks 12a and 12b can be almost eliminated by biaxial stretching blow molding.

EXAMPLES

By direct blow molding, various preforms (preforms A to H) having layer structures and types of resins shown in Table 1 (presented in FIG. 5) were formed. Here, an MFR of the resin other than the polyethylene resin and the polypropylene resin is a value measured by a method in accordance with JIS K7210. It should be noted that the shapes of the preforms A to H are, roughly, as shown in FIGS. 1 and 2, and the mold forming the bottom part has a four split structure.

Moreover, biaxial stretching blow was performed using these preforms A to H, and whether they could be stably shaped into containers were confirmed. The results are shown in Table 2 (presented in FIG. 6) and TABLE 3 (presented in FIG. 7). It should be noted that, in Tables 2 and 3, "stretch magnification" means the total stretch magnification (longitudinal magnification×traverse magnification) in longitudinal and transverse directions. In addition, "a container whose stretch magnification is about three fold" is a container with a shape, roughly, shown in FIG. 2, and "a container whose stretch magnification is about five fold" is a container with a shape of one size larger than the container with a shape, roughly, shown in FIG. 2. Moreover, in Table 2 and 3, "○" indicated that the preform did not rupture during biaxial stretching blow molding, in addition, the range of the molding conditions was wide, and the body thickness of the container was substantially uniform, "Δ" indicated that although the preform does not rupture during biaxial stretching blow molding, it shows that the body thickness at the lower end part of the neck ring 15, shown in FIG. 2, was thicker than the other parts, and "×" indicated that the preform ruptured during biaxial stretching blow molding or stable molding is difficult because of the narrow range of molding conditions.

As is apparent from Tables 2 and 3, in the biaxial stretching blow molding (Comparative example 3 to 10) using air as a pressurizing medium, since the preform ruptured during molding, or even if the rupture did not occur, it can be seen that it is difficult to stably mold because of the narrow range of molding conditions. It can be seen that this tendency strongly appears particularly in a container having a large stretching magnification. To counter this, when water is used as the pressurizing medium, containers (Example 1 to 3) with the preform configured of the polyethylene resin having MFR of 1.0 to 1.5 g/10 min, or containers (Example 4 to 6) with the preform configured of polypropylene resin having MFR of 0.8 to 2.3 g/10 min, by appropriately selecting the stretching magnification, the preform can be stably molded without rupturing. Further, when water is used as the pressurizing medium, the molding of a container having a large stretching magnification, which is difficult when air is used as the pressurizing medium, can be performed more stable than a container having a small stretching magnification, and it can be seen that the body thickness of the container can be made substantially even.

Figure 3:
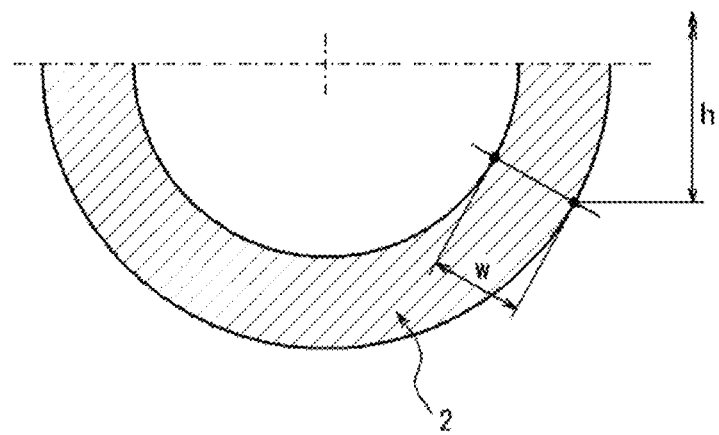
Figure 3:
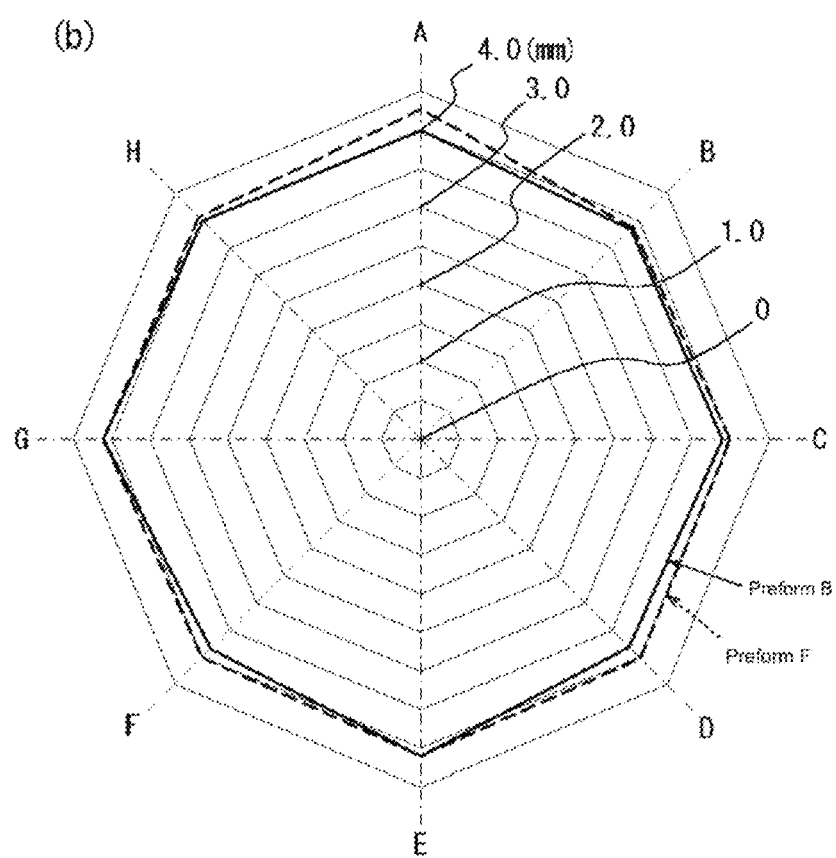
Figure 4:
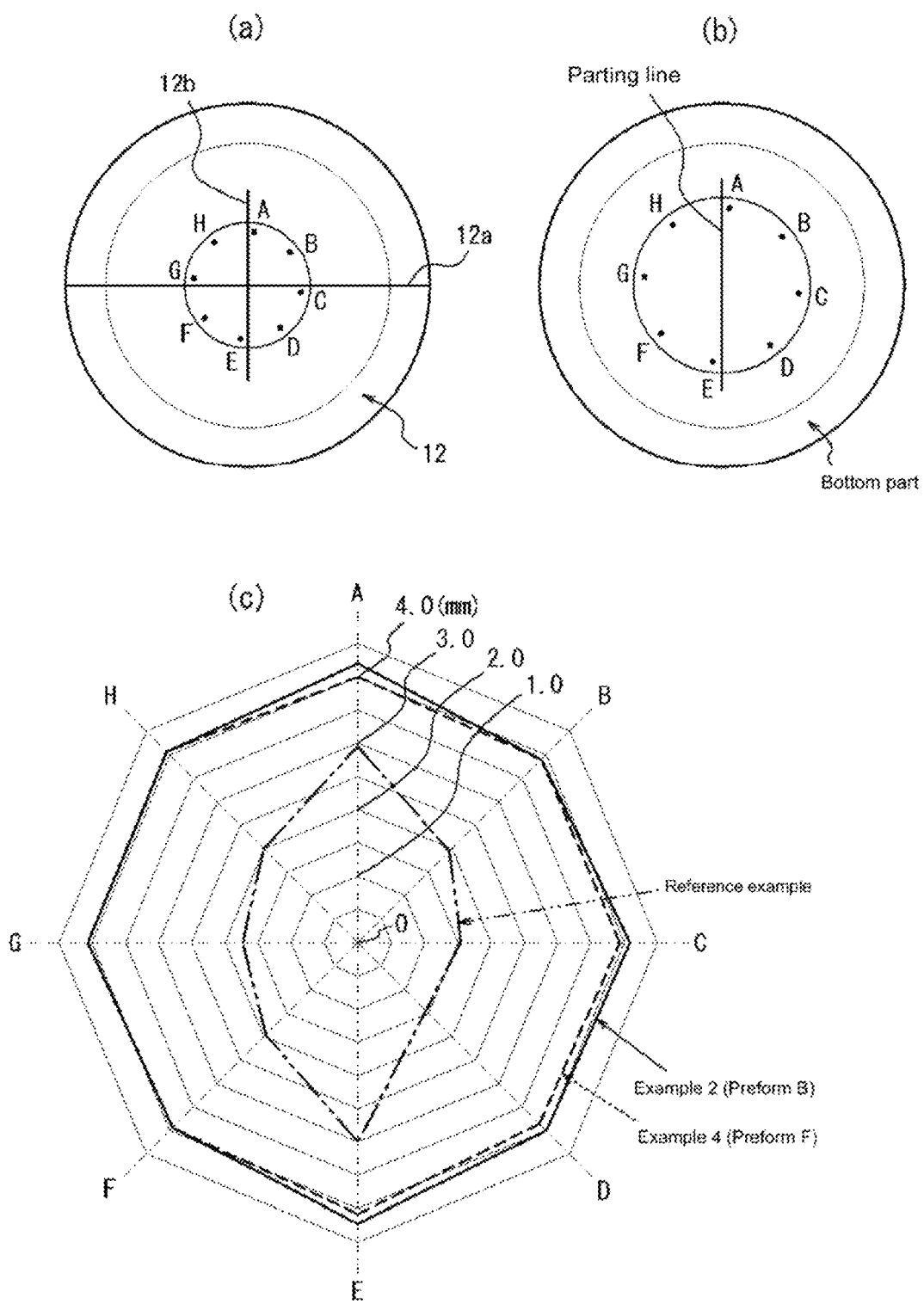

In addition, for the preform obtained by direct blow molding and the container obtained by biaxial stretching blow molding of this preform, the body thickness distribution at the bottom part was investigated. The results are shown in FIGS. 3 and 4. Here, FIG. 3 shows the preforms B and F as representative of the preforms A to H described above, as shown in FIG. 3(a), the body thickness w at a predetermined distance h from the neck ring is measured at eight places equalized in the circumferential direction, and the measurement results are shown in FIG. 3(b). In addition, FIG. 4 shows the containers of Example 2 and 4 using the preform B and F, as shown in FIG. 4(a), the body thickness of the bottom part of the container is measured at eight places, the points A to H (points A to H correspond to measurement points of the preform described above), and the measurement results are shown in FIG. 4(c). It should be noted that FIG. 4(b) shows a bottom view of a container (reference example) shaped similar to the container of Example 2 and Example 4 in which containers were directly formed from tubular melted parison by direct blow molding using a two split mold. Also for the reference example, the body thickness at the bottom part was measured at eight places, points A to H in FIG. 4(b), and the measurement result is shown in FIG. 4(c).

As shown in FIG. 3(b), the body thickness at the bottom part of the preforms B and F did not change much in the circumferential direction, and the circumferential body thickness distribution at the bottom part can be said to be close to even. In addition, as shown in FIG. 4(c), the body thickness at the bottom of Example 2 and 4 did not change much in the circumferential direction, and the circumferential body thickness distribution at the bottom part can be said to be close to even. On the other hand, the body thickness at the bottom part of the reference example shown in FIG. 4(c) is thick near the parting line and thin at a place shifted by 90 degrees against the parting line, and the circumferential body thickness distribution is uneven in the circumferential direction. That is, as in the present embodiment, by making the mold forming the bottom part of the preform to have a four split structure (so that the parting line formed at the bottom part is formed in a cross shape), it is seen that it is possible to bring the circumferential body thickness distribution at the bottom part closer to even.

Although the configuration of the present invention and its action and effect have been described above, the preform according to the present invention is not limited to the embodiment described above, and various modifications are possible within the scope according to the claims. For example, in the embodiment described above, the case where the container formed from the preform has a closed-end cylinder shape has been described, but other shapes such as a closed-end square tubular shape may be used, and a smaller or larger container than containers shown in figures can also be applied.

What is claimed is:

1. A preform shaped by direct blow molding for biaxial stretching blow molding into a container using a pressurizing liquid medium, the preform comprising:
    a closed end generally cylindrical body having a multilayer structure with at least one layer of a polyethylene resin having an MFR of 1.0 to 1.5 g/10 min., the multilayer structure having an inner layer configured of an ethylene vinyl alcohol copolymer resin inside an outer layer configured of the polyethylene resin; and
    a band shaped adhesive layer configured of a modified polyolefin resin and extending in the axial direction between the outer layer and the inner layer.

2. The preform according to claim 1, comprising an innermost layer configured of a modified polyolefin resin inside the inner layer.

3. The preform according to claim 1, further comprising a cross shaped parting line at a bottom part of the closed end generally cylindrical body.

4. A container shaped by biaxial stretching blow molding using a liquid pressurizing medium with the preform according to claim 3.

5. A preform shaped by direct blow molding for biaxial stretching blow molding into a container using a pressurizing liquid medium, the preform comprising:
    a closed end generally cylindrical body having at least one layer thereof being constituted of one of a polyethylene resin having an MFR of 1.0 to 1.5 g/10 min. and polypropylene resin having an MFR of 0.8 to 2.3 g/10 min.;
    the body having an inner layer configured of an ethylene vinyl alcohol copolymer resin inside an outer layer of the one the polyethylene resin and polypropylene resin; and
    an innermost layer configured of a modified polyolefin resin inside the inner layer.

6. The preform according to claim 5, comprising a cross shaped parting line at the bottom part.

7. A method of forming a container from a preform, the method comprising:
    extruding a resin tube structure, the resin being one of a polyethylene resin having an MFR of 1.0 to 1.5 g/10 min. and polypropylene resin having an MFR of 0.8 to 2.3 g/10 min.;
    forming a preform from the tube structure by direct blow molding using pressurized air as the blowing medium, the preform having a closed end generally cylindrical body;
    forming a container from the preform by biaxial stretching blow molding the preform into the container using a pressurizing liquid as the blowing medium; and
    the extruding step including extruding the tube structure as multilayer structure, wherein the multilayer structure an inner layer configured of an ethylene vinyl alcohol copolymer resin inside an outer layer configured of one of the polyethylene resin and the polypropylene resin, the multilayer structure further including a band shaped adhesive layer configured of a modified polyolefin resin and extending in the axial direction between the outer layer and the inner layer.

8. The method according to claim 7, wherein the multilayer structure has an innermost layer configured of a modified polyolefin resin.

9. The method according to claim 7, further comprising the step of forming a cross shaped parting line at a bottom part of the closed end generally cylindrical body.

* * * * *